US006937952B2

(12) United States Patent
Buckshaw

(10) Patent No.: US 6,937,952 B2
(45) Date of Patent: Aug. 30, 2005

(54) SATELLITE CARRIER MEASUREMENT SYSTEM AND METHOD

(75) Inventor: Raymond Buckshaw, Westtown, NY (US)

(73) Assignee: SES Americom, Inc., Princeton, NJ (US)

( * ) Notice: Subject to any disclaimer, the term of this patent is extended or adjusted under 35 U.S.C. 154(b) by 749 days.

(21) Appl. No.: 09/902,709

(22) Filed: Jul. 12, 2001

(65) Prior Publication Data

US 2003/0013409 A1 Jan. 16, 2003

(51) Int. Cl.[7] .............................................. G06F 19/00
(52) U.S. Cl. ........................ 702/76; 702/60; 324/76.19; 324/76.22; 455/12.1
(58) Field of Search .............................. 702/75, 76, 60; 324/76.19, 76.22, 76.39, 76.41; 455/9, 12.1, 63; 342/350, 358, 360, 352

(56) References Cited

U.S. PATENT DOCUMENTS 5,754,942 A * 5/1998 Wachs ............................ 455/9

OTHER PUBLICATIONS

Wernek, "A Satellite Monitoring System", Digital Satellite Communicationss, Tenth International Conference, May 15–19, 1995.*

Masters et al., "Automated EIRP Measurements on a Near–Field Range" Antenna Measurement techniques Associated Conference Sep. 30, 1996.*

Various webpages at www.sat.com from the SAT Corporation, date unknown.*

* cited by examiner

Primary Examiner—Patrick J. Assouad
(74) Attorney, Agent, or Firm—Fleshner & Kim, LLP

(57) ABSTRACT

A method for measuring the EIRP (Effective Isotropic Radiated Power) of a satellite downlink carrier signal is performed by or under the control of a processor located, for example, at a technical operations center of a satellite communications company. The processor operates in accordance with a computer program which automatically identifies a carrier frequency corresponding to a customer, measures a level and bandwidth of the downlink signal at the customer carrier frequency, determines a level of a reference carrier signal, compares the level of the downlink signal to the level of the reference carrier signal, and determines EIRP power of the downlink signal based on the comparing step. The measured EIRP value is then compared to an EIRP value contractually assigned to the customer, and the difference determines the manner in which the measured EIRP value deviates from the assigned power. The method measures carrier-signal power faster and more efficiently than conventional techniques, which are manually performed using separate hardware devices.

21 Claims, 2 Drawing Sheets

SATELLITE CARRIER MEASUREMENT SYSTEM AND METHOD

BACKGROUND OF THE INVENTION

1. Field of the Invention

This invention generally relates to monitoring the quality of satellite communications, and more particularly to a system and method for measuring satellite downline EIRP (Effective Isotropic Radiated Power) power of modulated radio frequency carrier signals.

2. Description of the Related Art

Satellite systems communicate information by establishing uplinks and downlinks between two earth stations on predetermined carrier frequencies. The earth stations may be fixed or mobile and the information may be voice, video, data, or a combination thereof.

In satellite subscriber systems, customers are usually assigned one or more carrier frequencies depending on available capacity. These carrier frequencies are usually contractually agreed to, along with performance parameters including power level. Periodically, system subscribers monitor the EIRP level of their transmissions by requesting such information from a technical operations center of the satellite communications provider. The EIRP level must be acceptable under the terms of the contract or steps must be taken to correct the quality of transmissions.

Conventional methods for measuring EIRP power involve a large number of steps, most of which are manually performed by a technician. These methods first require the technician to access a computer system (Transponder View) containing customer information. From this system, the technician would write down notes indicating the location on the transponder as well as other operational information. The technician would then manually input other information (e.g., frequency, span, reference level) into a spectrum analyzer using a panel keypad on the front of the instrument. Using the spectrum analyzer, the technician measures the bandwidth of a modulated RF carrier signal received from a satellite downlink (typically, at the 3 db points) and then the power level of the carrier signal as compared with a reference carrier, usually 10 dbw in strength.

After taking these measurements, the technician inputs them into a Visual Basic program (known as "SCPC Power") to achieve a calculated power reading of the modulated data carrier. The measured and calculated power readings are then compared to the contracted information from Transponder View computer system. From this comparison, problems associated with the satellite downlink are determined and subsequently addressed. From this comparison, the technician also determines if the customer's carrier is operating at the proper level. If the customer's carrier is operating at an excessive level in a power-shared transponder, other carriers handled by the transponder could be compressed or otherwise degraded. The customer may also experience degraded service because the carrier is operating at too low of a power level.

There are at least three drawbacks to the conventional methods discussed above. First, these methods require a large number of steps and many of them are manually performed. This makes the measurement process time inefficient, and the substantial involvement of a technician increases costs and introduces the possibility of human error. Second, the conventional methods require the use of separate hardware components, each of which must be manually operated by the technician. This further increases costs and inefficiencies. Third, conventional methods require the use of separate computer programs implemented at different stages of the measurement-taking process. For example, one program is embodied within the Transponder View computer system which a technician must initially access to obtain customer information. Another program is the Visual Basic program which the technician uses to obtain calculated power measurement readings. Using separate programs of this type further increases costs and inefficiencies. Also, the presence of a technician is a necessity because none of these programs "talk" to one another.

From the foregoing discussion, it is apparent that a need exists for a method of the measuring power of a satellite downlink carrier signal which is faster and more efficient than conventional methods.

SUMMARY OF THE INVENTION

It is a first object of the present invention to provide a method for measuring the power of a satellite downlink carrier signal which is faster and more efficient than conventional methods.

It is another object of the present invention to achieve the first object by providing a computer-implemented method which automatically performs all the steps necessary to measure power of the carrier signal, thereby substantially or altogether eliminating the role of the technician in the measurement-taking process. As a result, the method of the present invention advantageously reduces costs in terms of manpower and the need to use separate disjoint computer programs. Also, by automating the method steps preferably using a single comprehensive computer program, a quicker and more reliable response time may be realized.

The foregoing and other objects of the invention are achieved by providing a method which automatically takes satellite carrier power measurements, which method may advantageously replace conventional methods that are largely manual performed and disjoint in terms of their processing steps and hardware requirements. Preferably, the method is embodied within a single computer program implemented by a processor in a Technical Operations Center (TOC) maintained or managed on behalf of a satellite company.

In accordance with a preferred embodiment, the method of the present invention measures EIRP power of a modulated satellite downlink RF carrier by identifying a frequency corresponding to the carrier signal, measuring a power level and bandwidth of the carrier signal at said frequency, determining a level of a reference carrier signal, and calculating an EIRP power value for the carrier signal based on the measured power level and bandwidth and the level of said reference carrier signal. Advantageously, any one or more of the measuring, determining, and calculating steps are automatically performed under control of a computer program. This substantially reduces human involvement and therefore the costs associated therewith. At the same time, the power-measuring process is made faster and more efficient. To provide improved customer service, the calculated EIRP power value may be automatically displayed on a customer service terminal.

DESCRIPTION OF THE PREFERRED EMBODIMENTS

Figure 1:
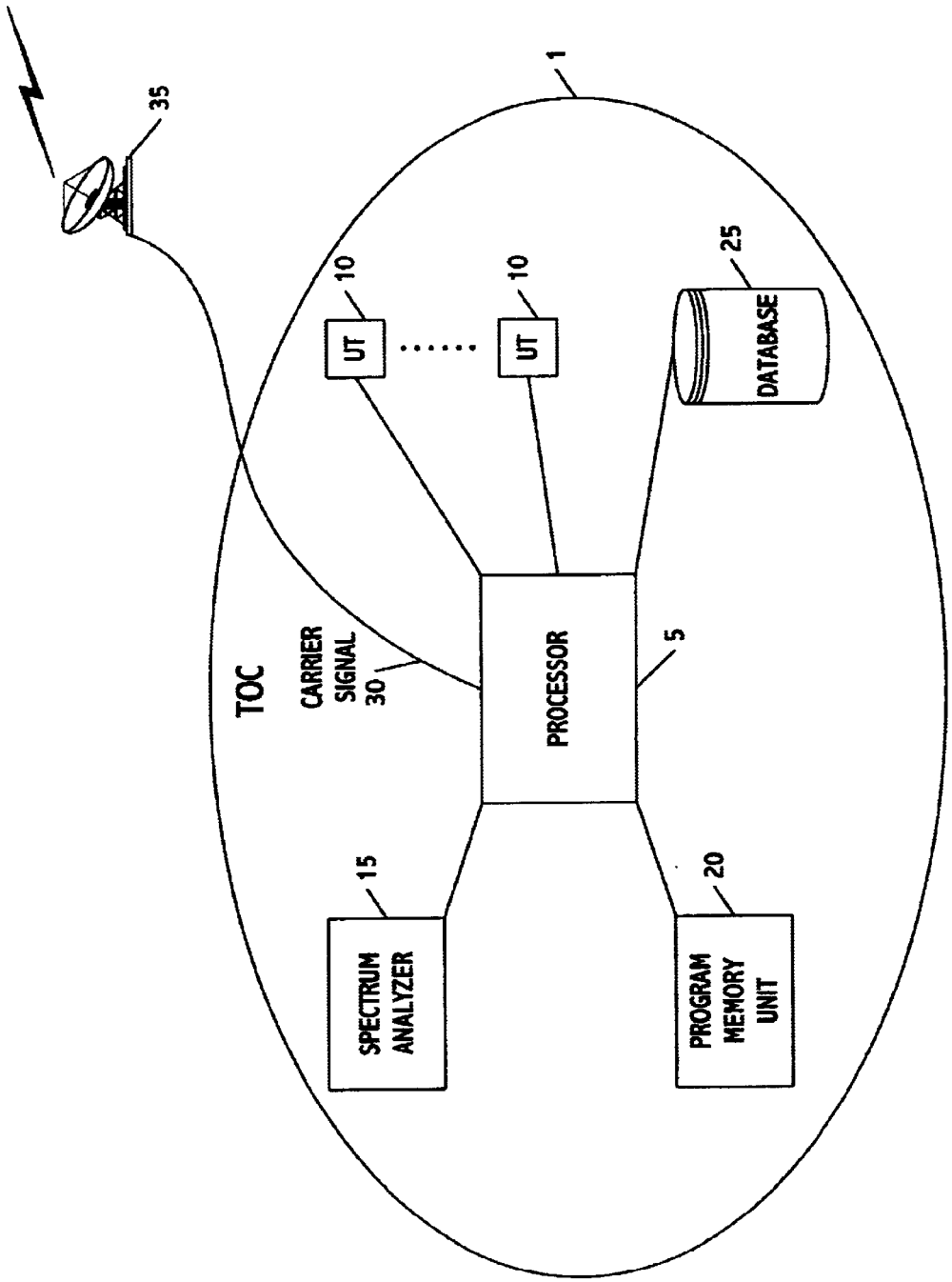
FIG. 1 is a block diagram of a preferred embodiment of the system of the present invention for automatically measuring power in satellite downlink carrier signals.

Referring to FIG. 1, a preferred embodiment of the system of the present invention is preferably implemented in a Technical Operations Center (TOC) 1 maintained or managed on behalf of a satellite communications company. The TOC includes a central processor 5, one or more user terminals 10, a spectrum analyzer 15, a memory unit 20, a database 25, and a link 30 connected to a satellite receiver 35 tuned to receive, for example, video (digital or analog) and/or audio signals. While the processor is shown as being physically located at the TOC, those skilled in the art can appreciate that the processor, the memory unit, and/or database may alternatively be connected to the TOC through a network. Further, while not specifically shown it is understood that the TOC is connected to a telephone system for receiving calls from customers relating to carrier power measurements.

The central processor executes a computer program used to implement the method of the present invention, as well as other programs/sub-routines the program may access to perform the steps of the method. The computer program includes code for automatically gaining access to and then controlling the spectrum analyzer, the satellite receiver, and any other hardware unit needed to measure power of a modulated carrier signal in accordance with the invention.

The program itself may be accessed through a "cockpit program" which resides on and is initiated by a representative at one of the user terminals in the TOC. Preferably, the cockpit program is a program that is used to choose the appropriate satellite, transponder, and polarization(vertical or horizontal). By first choosing the satellite and transponder (polarization is automatically chosen depending upon the satellite and transponder selected), the technician can then input the desired frequency of the carrier that needs to be measured for downlink EIRP.

The spectrum analyzer may be a conventional type which is configured or modified to receive control signals from the central processor. When instructed, the spectrum analyzer measures the power level and bandwidth of the modulated RF carrier signals directly from the satellite. The carrier bandwidth can be measured by adjusting the filtering (e.g., video bandwidth and resolution bandwidth) and the span of the carrier observed. The analyzer also automatically measures the power level of a reference carrier. The reference carrier may be automatically selected by the program based, for example, on the satellite and/or transponder selected. The reference carrier represents a fixed CW (continuous wave) carrier at a power level of 10 dbw at a specific frequency. The bandwidth and power-level measurements are automatically sent to the central processor for use in computing EIRP measurements of the carrier signal.

The database stores customer information which includes customer carrier frequency, transponder location, and other operational information such as the bandwidth of the carrier, that will be compared with the measured bandwidth, and the downlink EIRP at specific locations. These specific locations are usually the "Technical Operations Centers."

The EIRP power is the maximum power each customer in the system is allotted. Knowing the EIRP power in an integrated satellite system is advantageous in a number of respects. Perhaps most importantly, if EIRP power is significantly exceeded for any one customer, then other customers' carriers in the transponder may be degraded because power may be taken away from them. By measuring the downlink EIRP, each customer may be held to his contractual agreement. At the same, safeguards are ensured with respect to the other customers in the shared transponder. When the power level is exceeded, the customer would be expected to make necessary adjustments to establish the correct level.

Figure 2:
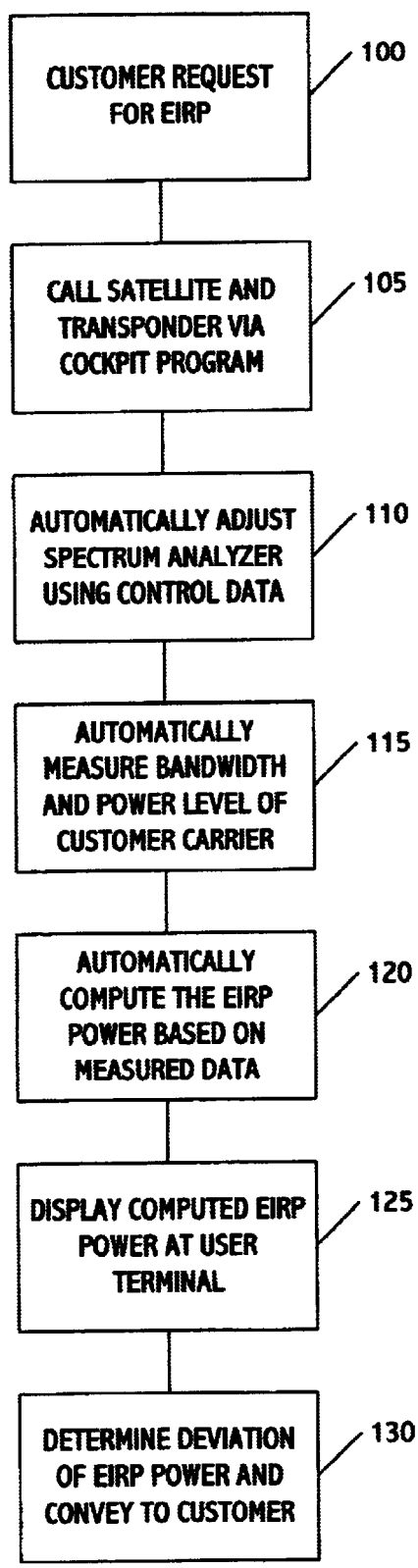
FIG. 2 is a flow diagram showing steps included in a preferred embodiment of the method of the present invention.

Referring to FIG. 2, a preferred embodiment of the method of the present invention for automatically measuring EIRP power begins when a customer calls the TOC in order to request receipt of downlink EIRP measurements of a carrier signal. (Block 100). The call may be taken by a representative at one of the user terminals. In response to the customer request, the representative initiates a computer program which automatically implements the steps of the method of the present invention for obtaining EIRP measurements. Initiation of the computer program may be made through activation of the cockpit program. As previously discussed, the cockpit program is a program used to select the appropriate satellite, transponder, and polarization of the carrier that needs to be observed or measured. Once this is established, the downlink EIRP program of the invention may be activated to automatically measure the power level of the customers' carrier.

Once initiated, the cockpit program calls a satellite and an appropriate transponder corresponding to the carrier signal based on, for example, information stored in the database. (Block 105). In accordance with a preferred embodiment of the method of the present invention, the cockpit program is only used to select the satellite and transponder and consequently the polarization for the carrier. The present invention may be a sub-routine that is used in conjunction with (e.g., is called by) the cockpit program.

Next, the program sends control information to the spectrum analyzer in order to automatically adjust the analyzer to the bandwidth (e.g., video bandwidth and/or resolution bandwidth), span, and carrier frequency identified as corresponding to the customer in the retrieved database information. (Block 110). The video bandwidth may be used for filtering the signal to an acceptable view. Practically speaking, this bandwidth 'cleans up' the carrier, and in this regard the program may be used to measure the downlink EIRP of SCPC (single carrier per channel) signals.

After these adjustments are made, the spectrum analyzer automatically measures the level and bandwidth of the customer's carrier signals within the specified bandwidth. (Block 115). This step may be performed by instructing the analyzer to automatically activate a delta marker, adjusting this marker to the 3 db point on one side of the carrier, and then having the analyzer store the carrier in a trace "A." The marker may be established at the peak amplitude of the carrier, after which the delta marker function is then activated. The analyzer may also activate a trace "B" and dial in the frequency of the 10 dbw reference carrier, which is then placed directly in relation to the delta marker on the customer's carrier. The spectrum analyzer is then instructed by the program to read and record the 3 db bandwidth and amplitude of the customer's carrier. The spectrum analyzer also measures the level of the reference carrier. This information along with the bandwidth and amplitude information is sent back to the central processor.

Next, the program automatically activates the downlink EIRP program stored in the memory unit and then inputs the 3 db bandwidth, amplitude, and reference carrier level information from the spectrum analyzer into the EIRP program. (Block 120). The program then automatically calculates the EIRP power of the customer's carrier signal in accordance with steps that include applying a modulateddata-carrier formula which computes a correction factor(CF) that is related to the power of an unmodulated carrier. The inputs to this formula are the measured bandwidth and the resolution bandwidth in which it is measured.

The modulated-data-carrier formula may be expressed as: CF=10*Log (Measured Bandwidth/Resolution Bandwidth). As indicated above, the resolution bandwidth is a selected value which adequately displays the true signal. An example would be 30 kHz, however those skilled in the art can appreciate that other values may be used. In accordance with the invention, the program discussed herein contains code which automatically adjusts the spectrum analyzer to a desired resolution bandwidth. Once calculated, the correction factor is added to the difference between the amplitude of the reference carrier and the amplitude of the modulated carrier to compute the downlink EIRP.

The steps performed by the present invention to automatically calculate EIRP power may be summarized as follows:

1. Save carrier in Register #1.
2. Perform maximum hold on the carrier to smooth out trace.
3. Save carrier in Register #2.
4. Perform a peak search on the carrier, and determine the maximum amplitude.
5. Activate a delta marker on a peak amplitude and move marker 3 db below peak on one side.
6. Move marker to other side of peak amplitude at 3 db down.
7. Output 3 db bandwidth.
8. Calculate correction factor as indicated above.
9. Recall Register #2.
10. Perform a peak search on the carrier, store in Trace A, and activate the delta marker.
11. Clear/Write Trace B.
12. Call the reference carrier for that transponder.
13. Output the difference between reference carrier amplitude and customers' modulated carrier amplitude.
14. Add the correction factor and marker amplitude difference to compute downlink EIRP.

Once the EIRP power level for the customer's carrier signal has been calculated, it is displayed at one of the user terminals under direction of the program via the central processor. (Block 125). Preferably, Transponder View and SAP data programs are used as the source of the contracted level information used in the comparison described above.

Finally, the EIRP power measurements and their deviation from the contracted assigned power is conveyed to the customer by the representative at the user terminal. (Block 130). The information may be conveyed over the phone, electronically via an e-mail, or any other form of conventional communication.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

I claim:

1. A method for automatically measuring EIRP power, comprising:
   receiving a request for an EIRP measurement of a customer carrier signal;
   activating a cockpit program to (a) select a satellite and transponder with an associated polarization corresponding to the customer carrier signal from a database, (b) select a reference carrier signal based on at least one of the selected satellite and transponder, (c) set a spectrum analyzer to one of a resolution or video bandwidth based on a predetermined code corresponding to the customer carrier signal, and (d) measures a level of the reference carrier signal and a level and bandwidth of the carrier signal within the resolution or video bandwidth based on the settings in (c);
   activating a power program to calculate an EIRP measurement of the customer carrier signal based on a difference between the measured reference carrier signal level and the measured customer carrier signal level; and
   providing the EIRP measurement to the customer in response to the request.

2. The method of claim 1, wherein the cockpit program performs (d) by:
   automatically activating delta marker;
   adjusting the delta marker to a predetermined point on one side of the customer carrier signal;
   storing the customer carrier signal in a trace A.

3. The method of claim 2, wherein the delta marker is established at a peak amplitude of the customer carder signal, after which the delta marker function is then activated.

4. The method of claim 2, wherein the cockpit program further:
   activates a trace B;
   dials in a frequency of the reference carder signal at 10 dbw;
   places the reference carrier signal in direct relation to the delta marker on the customer carrier signal; and
   reads and records a 3 db bandwidth and amplitude of the customer carrier signal.

5. The method of claim 4, wherein power program calculates the EIRP measurement by:
   applying a modulated-data-carrier formula which computes a correction factor (CF) related to a power of an unmodulated carrier; and
   adding the correction factor to the difference between the measured reference carrier signal level and the measured customer carrier signal level.

6. The method of claim 5, wherein said modulated-data carrier formula is CF=10*Log (MB/RB), where MB is the measured bandwidth of the custom carrier signal and RB is the resolution bandwidth.

7. The method of claim 5, wherein the cockpit program performs (d) by:
   saving the customer carrier signal in a first register;
   controlling maximum hold on the customer carrier signal to smooth out at least one of trace A and trace B;
   saving the customer carrier signal in a second register subsequent to the controlling step;
   controlling performance of a peak search on the customer carrier signal and determining a peak amplitude;
   activating the delta marker on the peak amplitude and moving the marker 3 db below peak on one side;
   moving the delta marker to another side of the peak amplitude at 3 db down;
   outputting a 3 db bandwidth;
   calculating the correction factor (CF) by applying said modulated-data-carrier formula;
   recalling the customer carrier signal from the second register;

controlling performance of a peak search on the recalled customer carrier signal, storing the result in trace A, and activating the delta marker;

clearing/write trace B;

call the reference carrier for the transponder;

outputting the difference between the measured reference carrier signal level and the modulated customer carrier signal level; and adding the correction factor and said difference to compute the EIRP measurement.

8. The method of claim 1, wherein the reference carrier signal is a fixed continuous wave carrier at a power level of 10 dbw at a predetermined frequency.

9. The method of claim 1, wherein the cockpit program sets the spectrum analyzer to a video bandwidth based on said predetermined code, and wherein the video bandwidth is selected to filter the customer carrier signal to a desired view.

10. The method of claim 1, wherein the power program calculates the EIRP measurement independent of a calibration of a downlink corresponding to the customer carrier signal.

11. A system for automatically measuring EIRP power, comprising:

a first processor executing a cockpit program in response to a request for an EIRP measurement of a customer carrier signal, said program (a) selecting a satellite and transponder with an associated polarization corresponding to the customer carrier signal from a database, (b) selecting a reference carrier signal based on at least one of the selected satellite and transponder, (c) setting a spectrum analyzer to one of a resolution or video bandwidth based on a predetermined code corresponding to the customer carrier signal, and (d) measuring a level of the reference carrier signal and a level and bandwidth of the carrier signal within the resolution or video bandwidth based on the settings in (c);

a second processor executing a power program to calculate an EIRP measurement of the customer carrier signal based on a difference between the measured reference carrier signal level and the measured customer carrier signal level; and output means for providing the EIRP measurement to the customer in response to the request.

12. The system of claim 11, wherein the cockpit program performs (d) by:

automatically activating delta marker;

adjusting the delta marker to a predetermined point on one side of the customer carrier signal;

storing the customer carrier signal in a trace A.

13. The system of claim 12, wherein the delta marker is established at a peak amplitude of the customer carrier signal, after which the delta marker function is then activated.

14. The system of claim 12, wherein the cockpit program further:

activates a trace B;

dials in a frequency of the reference carrier signal at 10 dbw;

places the reference carrier signal in direct relation to the delta marker on the customer carrier signal; and reads and records a 3 db bandwidth and amplitude of the customer carrier signal.

15. The system of claim 14, wherein power program calculates the EIRP measurement by:

applying a modulated-data-carrier formula which computes a correction factor (CF) related to a power of an unmodulated carrier; and adding the correction factor to the difference between the measured reference carrier signal level and the measured customer carrier signal level.

16. The system of claim 15, wherein said modulated-data-carrier formula is CF=10*Log (MB/RB), where MB is the measured bandwidth of the customer carrier signal and RB is the resolution bandwidth.

17. The system of claim 15, wherein the cockpit program performs (d) by:

saving the customer carrier signal in a first register;

controlling maximum hold on the customer carrier signal to smooth out at least one of trace A and trace B;

saving the customer carrier signal in a second register subsequent to the controlling step;

controlling performance of a peak search on the customer carrier signal and determining a peak amplitude;

activating the delta marker on the peak amplitude and moving the marker 3 db below peak on one side;

moving the delta marker to another side of the peak amplitude at 3 db down; outputting a 3 db bandwidth;

calculating the correction factor (CF) by applying said modulated-data-carrier formula;

recalling the customer carrier signal from the second register;

controlling performance of a peak search on the recalled customer carrier signal, storing the result in trace A, and activating the delta marker;

clearing/write trace B;

call the reference carrier for the transponder;

outputting the difference between the measured reference carrier signal level and the modulated customer carrier signal level; and adding the correction factor and said difference to compute the EIRP measurement.

18. The system of claim 11, wherein the reference carrier signal is a fixed continuous wave carrier at a power level of 10 dbw at a predetermined frequency.

19. The system of claim 11, wherein the cockpit program sets the spectrum analyzer to a video bandwidth based on said predetermined code, and wherein the video bandwidth is selected to filter the customer carrier signal to a desired view.

20. The system of claim 11, wherein the power program calculates the EIRP measurement independent of a calibration of a downlink corresponding to the customer carrier signal.

21. The system of claim 11, wherein the first and second processors are a same processor.

* * * * *